US012562140B2

(12) United States Patent
Seul Gi et al.

(10) Patent No.: US 12,562,140 B2
(45) Date of Patent: Feb. 24, 2026

(54) APPARATUS AND METHOD FOR DRIVING DISPLAY PANEL

(71) Applicant: LX SEMICON CO., LTD., Daejeon (KR)

(72) Inventors: Lee Seul Gi, Daejeon (KR); Kim Yong Hee, Daejeon (KR); Park Jun Young, Daejeon (KR); Lee Jin Ho, Daejeon (KR)

(73) Assignee: LX SEMICON CO., LTD, Daejon (KR)

( * ) Notice: Subject to any disclaimer, the term of this patent is extended or adjusted under 35 U.S.C. 154(b) by 0 days.

(21) Appl. No.: 18/395,224

(22) Filed: Dec. 22, 2023

(65) Prior Publication Data

US 2024/0233667 A1 Jul. 11, 2024

(30) Foreign Application Priority Data

Jan. 5, 2023 (KR) ........................ 10-2023-0001825

(51) Int. Cl.
*G09G 5/02* (2006.01)

(52) U.S. Cl.
CPC ....... *G09G 5/02* (2013.01); *G09G 2320/0242* (2013.01); *G09G 2320/0271* (2013.01); *G09G 2320/0666* (2013.01); *G09G 2354/00* (2013.01); *G09G 2360/16* (2013.01); *G09G 2380/08* (2013.01)

(58) Field of Classification Search
None
See application file for complete search history.

(56) References Cited

U.S. PATENT DOCUMENTS

| | | | | |
|---|---|---|---|---|
| 6,151,410 | A * | 11/2000 | Kuwata | H04N 1/6077 382/167 |
| 7,081,906 | B2 * | 7/2006 | Kim | G09G 3/2022 345/63 |
| 2012/0268353 | A1 * | 10/2012 | Mizukoshi | G09G 3/2003 345/76 |
| 2015/0179136 | A1 * | 6/2015 | Miller | G09G 5/04 345/690 |
| 2015/0235619 | A1 * | 8/2015 | Yeo | G09G 3/3413 345/690 |
| 2016/0140913 | A1 * | 5/2016 | Aragane | G09G 5/02 345/77 |
| 2016/0163027 | A1 * | 6/2016 | Gal | G06T 5/73 382/167 |
| 2016/0217766 | A1 * | 7/2016 | Peana | G09G 5/06 |
| 2017/0004751 | A1 * | 1/2017 | Seo | G09G 3/3233 |
| 2017/0098432 | A1 * | 4/2017 | Heo | G09G 5/026 |
| 2017/0256595 | A1 * | 9/2017 | Wang | G09G 3/3413 |
| 2020/0410945 | A1 * | 12/2020 | Ji | G09G 3/3426 |
| 2022/0351657 | A1 * | 11/2022 | Yim | G09G 3/035 |

OTHER PUBLICATIONS

European Search Report, for European Patent Application No. 23220674.8, mailed May 27, 2024; 12 pages.

* cited by examiner

*Primary Examiner* — Dorothy Harris
(74) *Attorney, Agent, or Firm* — Greenberg Traurig, LLP

(57) ABSTRACT

An apparatus for processing an image signal includes an RGB color difference calculator and a gain calculator. The RGB color difference calculator calculates an RGB color difference of a color to be displayed in each of unit pixels based on a red image signal, a green image signal, and a blue image signal to be input to the unit pixel. The gain calculator calculates a gain for the blue image signal based on the RGB color difference.

14 Claims, 5 Drawing Sheets

APPARATUS AND METHOD FOR DRIVING DISPLAY PANEL

CROSS-REFERENCE TO RELATED APPLICATIONS

This application claims the benefit of the Korean Patent Application No. 10-2023-0001825 filed on Jan. 5, 2023, which is hereby incorporated by reference as if fully set forth herein.

BACKGROUND

Technical Field

The present disclosure relates to an apparatus and method for driving a display.

Related Art

Display devices such as televisions (TVs) and monitors are equipped with light sources such as Light Emitting Diodes (LEDs) as backlights for displaying images. LED light sources tend to emit more blue light than conventional fluorescent, incandescent, or halogen lights.

Prolonged exposure to blue light can be harmful to the body as it may cause eye strain, dry eyes, and in severe cases, damage to the retina or lens of the eye. In addition, prolonged use of display devices late at night may also interfere with sleep by depressing the release of sleep-inducing hormones due to blue light.

To reduce the amount of emission of blue light, methods such as artificially reducing the blue light signal component emitted by a light source or attaching a filter that physically blocks the transmission of the blue light signal component are used.

However, with the above methods of reducing the blue light signal component, the image quality may change drastically, causing visual inconvenience to users who are continuously watching the screen.

In addition, since the image quality is changed uniformly regardless of the characteristics of the currently displayed image, it is difficult to provide optimal image quality for the user's working environment, and it is difficult to adaptively respond to changes in the input image.

Even in the case of using a physical filter, blue light is blocked by the filter unilaterally regardless of the characteristics of the image. As a result, it is difficult to provide image quality suitable for the user and difficult to appropriately cope with changes in the input image.

SUMMARY

The present disclosure is directed to an apparatus and method for driving a display that substantially address one or more problems due to limitations and disadvantages of the related art.

An object of the present disclosure devised to solve the above-mentioned problems is to provide a display driving apparatus and a display driving method for reducing the amount of emission of blue light according to a characteristic of an input image.

To achieve these objects and other advantages and in accordance with the purpose of the disclosure, as embodied and broadly described herein, an apparatus for driving a display may include an RGB color difference calculator configured to calculate an RGB color difference of a color to be displayed in each of unit pixels based on a red image signal, a green image signal, and a blue image signal to be input to the unit pixel, and a gain calculator configured to calculate a gain for the blue image signal based on the RGB color difference.

In another aspect of the present disclosure, a method of driving a display may include calculating, by an RGB color difference calculator, an RGB color difference of a color to be displayed in each of unit pixels based on a red image signal, a green image signal, and a blue image signal to be input to the unit pixel, calculating, by a gain calculator, a gain based on the RGB color difference, and applying, by a gain application module, the gain to the blue image signal.

An apparatus and method for driving a display according to the present disclosure can reduce blue light according to a color feature of an image, thereby preventing color degradation.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate aspects of the disclosure and together with the description serve to explain the principle of the disclosure. In the drawings.

DETAILED DESCRIPTION

Figure 1:
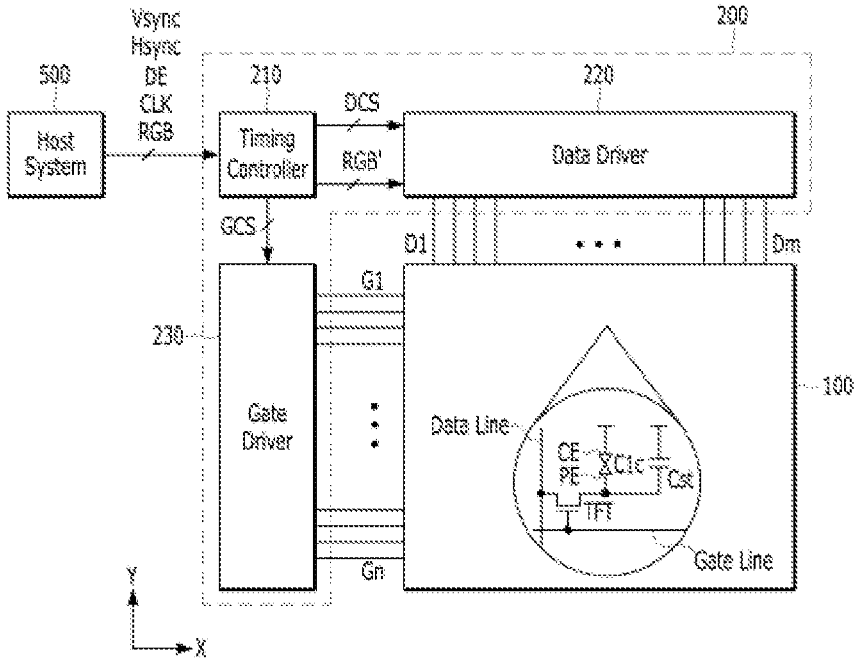
FIG. 1 is a block diagram illustrating a display device including a display driving apparatus according to an aspect of the present disclosure.

Throughout the specification, like reference numerals are used to refer to substantially the same components. In the following description, detailed descriptions of components and features known in the art may be omitted if they are not relevant to the core configuration of the present disclosure. The meanings of terms used in this specification are to be understood as follows.

The advantages and features of the present disclosure, and methods of achieving them, will become apparent from the detailed description of the embodiments, together with the accompanying drawings. However, the present disclosure is not limited to the embodiments disclosed herein and will be implemented in many different forms. The embodiments are provided merely to make the disclosure of the present invention thorough and to fully inform one of ordinary skill in the art to which the present disclosure belongs of the scope of the disclosure. It is to be noted that the scope of the present disclosure is defined only by the claims.

The figures, dimensions, ratios, angles, numbers of elements given in the drawings are merely illustrative and are not limiting. Like reference numerals refer to like elements throughout the specification. Further, in describing the present disclosure, descriptions of well-known technologies may be omitted in order to avoid obscuring the gist of the present disclosure.

As used herein, the terms "includes," "has," "comprises," and the like should not be construed as being restricted to the means listed thereafter unless specifically stated otherwise. Where an indefinite or definite article is used when referring to a singular noun e.g. "a" or "an", "the", this includes a plural of that noun unless something else is specifically stated.

Elements are to be interpreted a margin of error, even if not explicitly stated otherwise.

In describing temporal relationships, terms such as "after," "subsequent to," "next to," "before," and the like may include cases where any two events are not consecutive, unless the term "immediately" or "directly" is explicitly used.

While the terms first, second, and the like are used to describe various elements, the elements are not limited by these terms. These terms are used merely to distinguish one element from another. Accordingly, a first element referred to herein may be a second element within the technical idea of the present disclosure.

It should be understood that the term "at least one" includes all possible combinations of one or more related items. For example, the phrase "at least one of the first, second, and third items" may mean each of the first, second, or third items, as well as any possible combination of two or more of the first, second, and third items.

Features of various embodiments of the present disclosure may be partially or fully combined. As will be clearly appreciated by those skilled in the art, various interactions and operations are technically possible. Embodiments can be practiced independently of each other or in conjunction with each other.

Figure 2:
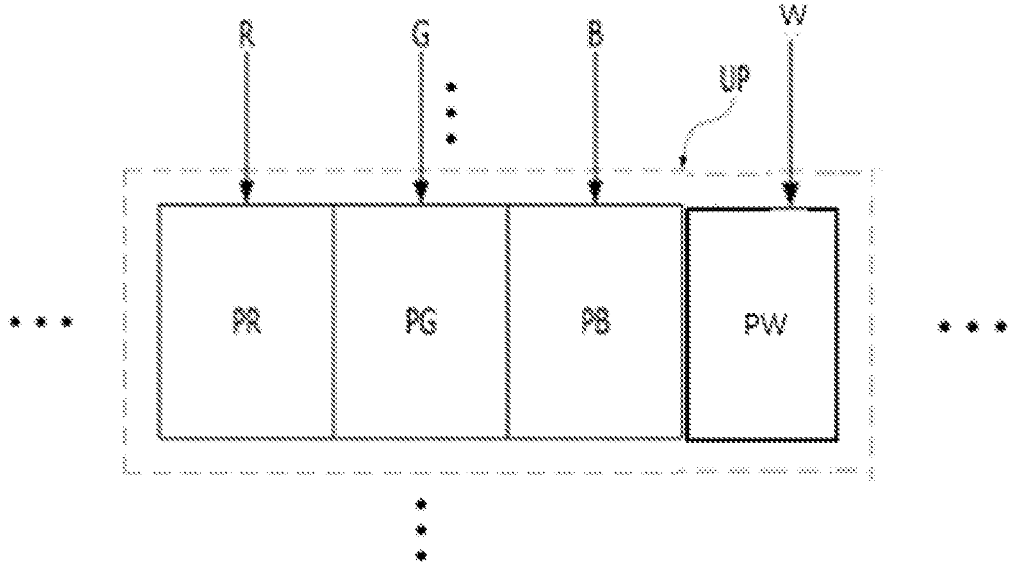
FIG. 2 is a diagram schematically illustrating a unit pixel of a display panel driven by the display driving apparatus according to the aspect of the present disclosure.

Hereinafter, a display device including a display driving apparatus according to an aspect of the present disclosure will be described in detail with reference to FIGS. 1 and 2. FIG. 1 is a block diagram illustrating a display device including a display driving apparatus according to an aspect of the present disclosure. FIG. 2 is a diagram schematically illustrating a unit pixel of a display panel driven by the display driving apparatus according to the embodiment of the present disclosure.

Referring to FIG. 1, the display device according to one aspect of the present disclosure includes a display panel 100, and a display driving apparatus 200.

The display panel 100 may be implemented as a flat panel display, such as a liquid crystal display (LCD) or an organic light emitting diode (OLED) display. In other words, the display panel 100 may be of any type.

For simplicity, however, a liquid crystal display (LCD) display panel will be described below as an example of the present disclosure.

The display panel 100 may include a plurality of gate lines G1 to Gn, a plurality of data lines D1 to Dm, and a plurality of pixels (not shown) to display an image of a predetermined luminance.

Each of the plurality of gate lines G1 to Gm receives a scan pulse input in a display period (DP). Each of the plurality of data lines D1 to Dn receives a data signal in the DP. The plurality of gate lines G1 to Gn and the plurality of data lines D1 to Dn are arranged on a substrate to intersect each other to define a plurality of pixel regions. Each of the plurality of pixels may include a thin-film transistor (TFT) connected to an adjacent gate line and data line, a pixel electrode (PE) and a common electrode (CE) connected to the TFT, a liquid crystal capacitor Clc arranged between the PE and the CE, and a storage capacitor Cst connected to the PE.

Further, according to one aspect of the present disclosure, as shown in FIG. 2, the display panel 100 may be composed of unit pixels (UP) including a red pixel PR, a green pixel PG, and a blue pixel PB. The red pixel PR, green pixel PG, and blue pixel PB included in one UP may be positioned adjacent to each other. Each of the red pixel PR, the green pixel PG, and the blue pixel PB included in the UP may receive an image signal R, G, or B for each color from the data driver 220 via a data line and display a gradient corresponding to the image signal R, G, B for each color.

The pixels included in the UP are not limited thereto, and the display panel 100 may be composed of UPs including a red pixel PR, a green pixel PG, a blue pixel PB, and a white pixel PW, wherein the red pixel PR, the green pixel PG, the blue pixel PB, and the white pixel PW included in one UP may be positioned adjacent to each other.

The display driving apparatus 200 may include a timing controller 210, a data driver 220, and a gate driver 230. The timing controller 210, the data driver 220, and the gate driver 230 may each be configured as an integrated circuit (IC), but are not limited thereto. An example integrated circuit may include at least one of the timing controller 210, the data driver 220, and the gate driver 230.

The timing controller 210 receives various timing signals including a vertical synchronization signal Vsync, a horizontal synchronization signal Hsync, a data enable signal DE, and a clock signal CLK from the host system 500, and generates a gate control signal GCS for controlling the gate driver 230 and a data control signal DCS for controlling the data driver 220. In addition, the timing controller 210 receives an image signal RGB from an external system, converts the image signal into a form that can be processed by the data driver 220, and outputs an image signal RGB'.

The data driver 220 receives the data control signal DCS and the image signal RGB' from the timing controller 210. The data control signal DCS may include a source start pulse SSP, a source sampling clock SSC, and a source output enable signal SOE. The source start pulse controls the timing of the start of data sampling by the data driver 220. The source sampling clock SSC is a clock signal for controlling the sampling timing of data. The source output enable signal SOE controls the timing of the output.

In addition, the data driver 220 converts the received image signal RGB' into an analog data signal and supplies the data signal to the pixels through a plurality of data lines D1 to Dn.

The gate driver 230 receives the gate control signal GCS from the timing controller 210. The gate control signal GCS may include a gate start pulse GSP, a gate shift clock GSC, and a gate output enable signal. The gate driver 230 generates a gate pulse (or scan pulse) synchronized with the data signal through the received gate control signal GCS, shifts the generated gate pulse, and sequentially supplies the shifted gate pulse to the gate lines G1 to Gm. To this end, the gate driver 230 may include a plurality of gate drive ICs (not shown). Under control of the timing controller 210, the gate drive ICs sequentially supply the gate pulse synchronized with the data signal to the gate lines G1 through Gn to select a data line on which the data signal is input. The gate pulse swings between a gate high voltage and a gate low voltage.

According to one aspect of the present disclosure, the display driving apparatus 200 may include a blue light controller 240 (see FIG. 3) configured to regulate emission of blue light from the display panel 100. For example, at least one of the timing controller 210, the data driver 220, and the gate driver 230 described above may include and/or interface with the blue light controller 240. However, embodiments are not limited thereto. The blue light controller 240 and/or components thereof may be included in a single chip or IC that includes all of the timing controller 210, the data driver 220, and the gate driver 230, or may be included in a single chip or IC that includes at least one of the timing controller 210, the data driver 220, and the gate driver 230.

The host system 500 converts digital image data into a format suitable for display on the display panel 100. The host system 500 transmits the converted digital image data along with timing signals Vsync, Hsync, GCS, and DCS to the timing controller 210. The host system can be implemented by a television system, a set-top box, a navigation system, a digital video disc (DVD) player, a Blu-ray player, a personal computer (PC), a home theater system, and a phone system to receive an input image.

Figure 3:
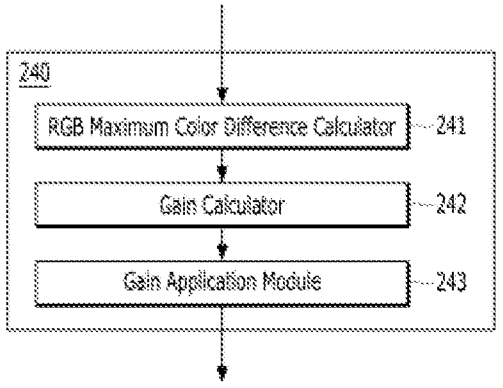
FIG. 3 is a block diagram of a blue light controller included in the display driving apparatus according to the aspect of the present disclosure.
Figure 4:
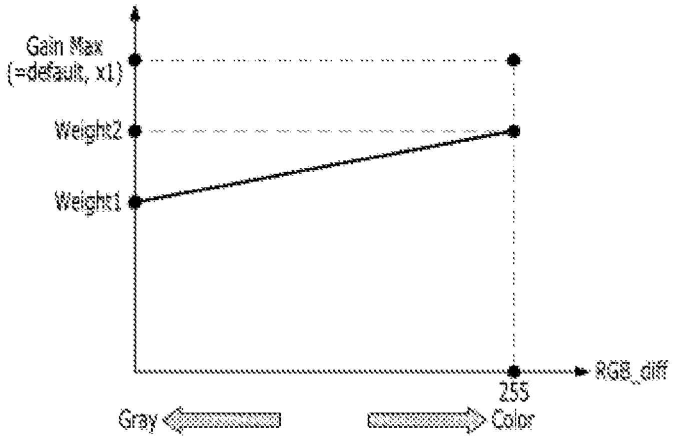
FIG. 4 is a graph depicting a gain calculated according to one aspect of the present disclosure.

Hereinafter, a display driving apparatus according to one embodiment of the present disclosure will be described in detail with reference to FIGS. 3 and 4. FIG. 3 is a block diagram of a blue light controller included in the display driving apparatus according to the embodiment of the present disclosure, and FIG. 4 is a graph depicting a gain calculated according to one aspect of the present disclosure.

Referring to FIG. 3, the blue light controller 240 according to one embodiment of the present disclosure may identify the characteristics of the color displayed in each UP based on the input image signal RGB, and may correct the blue image signal B according to the characteristics of the identified color while preventing color degradation. Specifically, the input image signal RGB includes a red image signal R, a green image signal G, and a blue image signal B for each UP. The blue light controller 240 calculates a gain based on the difference among the input red image signal R, green image signal G, and blue image signal B corresponding to the red pixel PR, green pixel PG, and blue pixel PB of each UP, and applies the calculated gain to the blue image signal B. To this end, the blue light controller 240 (e.g., a circuit, IC, and/or chip) includes an RGB color difference calculator 241 (e.g., an RGB color difference calculator circuit which in some examples correspond to a processor configured with instructions), a gain calculator 242 (e.g., a gain calculator circuit which in some examples correspond to a processor configured with instructions), and a gain application module 243 (e.g., a gain application circuit which in some examples correspond to a processor configured with instructions).

The RGB color difference calculator 241 calculates the RGB color difference RGB_diff of the color to be displayed in each UP. Since the red image signal R, the green image signal G, and the blue image signal B are values corresponding to the gradients in the red pixel PR, the green pixel PG, and the blue pixel PB of each UP, the RGB color difference calculator 241 calculates the maximum value of the image signal difference of the color to be displayed in each UP based on the red image signal R, the green image signal G, and the blue image signal B, and computes the calculated maximum value of the image signal difference as the RGB color difference RGB_diff. Specifically, according to one aspect of the present disclosure, the RGB color difference calculator 241 calculates the absolute value of the difference between the red image signal R and the green image signal G, the absolute value of the difference between the green image signal G and the blue image signal B, and the absolute value of the difference between the blue image signal B and the red image signal R, and computes the greatest of the absolute value of the difference between the red image signal R and the green image signal G, the absolute value of the difference between the green image signal G and the blue image signal B, and the absolute value of the difference between the blue image signal B and the red image signal R as the RGB color difference RGB_diff.

The gain calculator 242 calculates a gain for correcting the blue image signal B based on the RGB color difference RGB_diff calculated by the RGB color difference calculator 241. Specifically, as shown in FIG. 4, the gain calculator 242 may calculate a gain based on a first weight value weight1 and a second weight value weight2 predetermined by a user, a maximum RGB color difference RGB_diff_MAX, and the RGB color difference RGB_diff according to Equation 1.

$$\text{gain} = \frac{(weight2 - weight1)}{\text{RGB\_diff\_MAX}} \times \text{RGB\_diff} + weight1 \qquad \text{Equation 1}$$

According to one aspect of the present disclosure, as shown in FIG. 4, the first weight weight1 and the second weight weight2 may be less than 1, and the first weight weight1 may be less than the second weight weight2. Accordingly, the gain for correcting the red image signal R, the green image signal G, and the blue image signal B may have a greater value as the RGB color difference RGB_diff increases.

As RGB color difference RGB_diff decreases, the color becomes less saturated, and thus the color to be displayed in the UP is closer to white or gray. As the RGB color difference RGB_diff increases, the color is more saturated, and thus the color to be displayed may be brighter. According to one aspect of the present disclosure, as described above, the first weight weight1 is less than the second weight weight2. Therefore, according to FIG. 4 and Equation 1, as the RGB color difference RGB_diff decreases, a smaller gain is calculated. As the RGB color difference RGB_diff increases, a larger gain is calculated. In other words, when the RGB color difference RGB_diff is small, and the color displayed by the corresponding UP is less saturated, a smaller gain may be yielded. When the RGB color difference RGB_diff is large, and the color displayed by the corresponding UP is more saturated, a larger gain may be yielded.

The gain application module 243 applies the gain calculated by the gain calculator 242 to the blue image signal B to output a blue corrected image signal B_g. Specifically, the gain application module 243 outputs the blue corrected image signal B_g based on the gain and the maximum value gain_MAX of the gain according to Equation 2 below.

$$\text{B\_g} = (B \times \text{gain}) / \text{gain\_MAX} \qquad \text{Equation 2}$$

Further, the gain application module 243 may apply the gain calculated by the gain calculator 242 to the red image signal R and the green image signal G, as well as to the blue image signal B, to output a red corrected image signal R_g, a green corrected image signal G_g, and a blue corrected image signal G_g.

According to one aspect of the present invention, when the RGB color difference RGB_diff is small and thus the color displayed by the corresponding UP is less saturated, a smaller gain may be applied to the image signal. When the RGB color difference RGB_diff is large and thus the color displayed by the corresponding UP is more saturated, a larger gain may be applied to the image signal. Accordingly, as the saturation of the color displayed by the corresponding UP is lowered, the amount of blue light emitted from the blue pixel PB may be reduced, thereby reducing the impact of blue light from the display panel 100 on the user's body. Also, by applying a smaller gain to a UP displaying a less saturated color, color degradation may be prevented.

Figure 5:
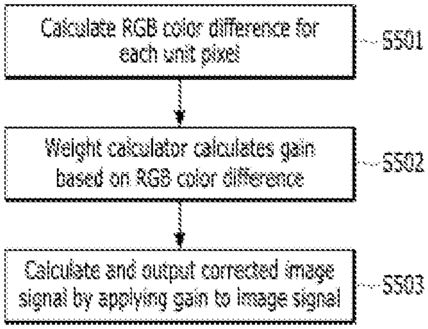
FIG. 5 is a flowchart of a method of driving a display according to one aspect of the present disclosure.

Hereinafter, a method of driving a display according to one aspect of the present disclosure will be described in detail with reference to FIG. 5. FIG. 5 is a flowchart of a method of driving a display according to one aspect of the present disclosure.

With the display driving method according to one aspect of the present disclosure, the characteristics of the color displayed in each UP may be identified based on the input image signal RGB, and the red image signal R, green image signal G, and blue image signal B input to the blue pixel PB may be corrected according to the identified characteristics of the color. Thereby, color degradation may be prevented.

Referring to FIG. 5, the RGB color difference calculator 241 first calculates the RGB color difference RGB_diff of the color to be displayed in each UP (S501). Specifically the RGB color difference calculator 241 calculates the maximum value of the image signal difference of the color to be displayed in each UP as the RGB color difference RGB_diff based on the red image signal R, the green image signal G, and the blue image signal B. In other words, according to one aspect of the present disclosure, the RGB color difference calculator 241 calculates the absolute value of the difference between the red image signal R and the green image signal G, the absolute value of the difference between the green image signal G and the blue image signal B, and the absolute value of the difference between the blue image signal B and the red image signal R, and computes the greatest of the absolute value of the difference between the red image signal R and the green image signal G, the absolute value of the difference between the green image signal G and the blue image signal B, and the absolute value of the difference between the blue image signal B and the red image signal R as the RGB color difference RGB_diff.

Then, the gain calculator 242 calculates a gain for correcting the blue image signal B based on the RGB color difference RGB_diff (S502). As shown in FIG. 4, the gain calculator 242 may calculate the gain based on a first weight weight1 and a second weight weight2 predetermined by the user, the maximum RGB color difference RGB_diff_MAX, and the RGB color difference RGB_diff according to Equation 1 above.

Here, the first weight weight1 and the second weight weight2 may be less than 1, and the first weight weight1 may be less than the second weight weight2. Accordingly, the gain for correcting the red image signal R, the green image signal G, and the blue image signal B may have a greater value as the RGB color difference RGB_diff increases.

Then, the gain application module 243 applies the gain to the blue image signal B to calculate and output a blue corrected image signal B_g (S503). Specifically, the gain application module 243 outputs the blue corrected image signal B_g based on the gain and the maximum value gain_MAX of the gain according to Equation 2 above.

According to one aspect of the present disclosure, when the RGB color difference RGB_diff is smaller and thus the color displayed by the corresponding UP is less saturated, a smaller gain may be applied to the red image signal R. When the RGB color difference RGB_diff is larger and thus the color displayed by the corresponding UP is more saturated, a larger gain may be applied to the red image signal R. Accordingly, as the saturation of the color displayed by the corresponding UP is lowered, the amount of light emitted from the blue pixel PB may be reduced, thereby protecting the eyesight of the user from the display panel 100 and improving convenience. Also, by applying a smaller gain to a UP displaying a less saturated color, color degradation may be prevented.

It will be appreciated by those skilled in the art to which the present disclosure belongs that the disclosure described above may be practiced in other specific forms without altering its technical ideas or essential features.

Further, the methods described herein may be implemented, at least in part, using one or more computer programs or components. The components may be provided as a set of computer instructions on a computer-readable medium including volatile and non-volatile memories or on a machine-readable medium. The instructions may be provided as software or firmware and may be implemented, in whole or in part, in hardware configurations such as application-specific integrated circuits (ASICs), field-programmable gate arrays (FPGAs), digital signal processors (DSPs), or other similar devices. The instructions may be configured to be executed by one or more processors or other hardware components, wherein the processors or other hardware components perform or are enabled to perform all or a part of the methods and procedures disclosed herein when executing the above set of computer instructions.

It should therefore be understood that the embodiments described above are exemplary and non-limiting in all respects. The scope of the present disclosure is defined by the appended claims, rather than by the detailed description above, and should be construed to cover all modifications or variations derived from the meaning and scope of the appended claims and the equivalents thereof.

What is claimed is:

1. An apparatus for processing an image signal, comprising:
- an RGB color difference calculator circuit configured to:
  - calculate a maximum RGB color difference between-among input image signals respectively input to a red pixel, a green pixel, and a blue pixel of each of a plurality of unit pixels based on the input image signals including a red image signal, a green image signal, and a blue image signal to be input to each unit pixel;
- a gain calculator circuit configured to calculate a gain for the blue image signal based on the RGB color difference by using at least two weight values, wherein at least two weight values include a predetermined first weight value and a predetermined second weight value; and
- a gain application circuit configured to apply the gain to the blue image signal to output a blue corrected image signal.

2. The apparatus of claim 1, wherein the RGB color difference calculator circuit is configured to:
- calculate an absolute value of a difference between the red image signal and the green image signal, an absolute value of a difference between the green image signal and the blue image signal, and an absolute value of a difference between the blue image signal and the red image signal; and calculate a greatest value among the absolute value of the difference between the red image signal and the green image signal, the absolute value of the difference between the green image signal and the blue image signal, and the absolute value of the difference between the blue image signal and the red image signal as the RGB color difference.

3. The apparatus of claim 1, wherein the gain decreases as the RGB color difference decreases.

4. The apparatus of claim 1, wherein the gain decreases as saturation of each of the unit pixels decreases.

5. The apparatus of claim 1, wherein the gain calculator circuit calculates the gain according to:

$$\text{gain} = \frac{(\text{weight2} - \text{weight21})}{\text{RGB\_diff\_MAX!}} \times \text{RGB\_diff} + \text{weight1},$$

wherein:

the weight1 denotes the first weight value, and the weight2 denotes the second weight value;

the RGB_diff_MAX denotes a maximum RGB color difference; and the RGB_diff denotes the RGB color difference.

6. The apparatus of claim 5, wherein the first weight value and the second weight value are less than 1 and greater than 0, wherein the first weight value is less than the second weight value.

7. The apparatus of claim 1, wherein the gain application circuit outputs the blue corrected image signal by applying the gain and a maximum value of the gain to the blue image signal according to:

$$\text{B\_g} = \frac{(B \times \text{gain})}{\text{gain\_MAX}},$$

wherein:

the gain_MAX denotes the maximum value of the gain;

the B denotes the blue image signal; and the B_g denotes the blue corrected image signal.

8. A method of processing an image signal, the method comprising:

calculating, by an RGB color difference calculator circuit, a maximum RGB color difference among image input signals respectively input to a red pixel, a green pixel, and a blue pixel of each of a plurality of unit pixels based on the input image signals including a red image signal, a green image signal, and a blue image signal to be input to each unit pixel;

calculating, by a gain calculator circuit, a gain for the blue image signal based on the RGB color difference by using at least two weight values, wherein at least two weight values include a predetermined first weight value and a predetermined second weight value; and applying, by a gain application circuit, the gain to the blue image signal, and outputting a blue corrected image signal.

9. The method of claim 8, wherein the calculating of the RGB color difference comprises:

calculating an absolute value of a difference between the red image signal and the green image signal, an absolute value of a difference between the green image signal and the blue image signal, and an absolute value of a difference between the blue image signal and the red image signal; and calculating a greatest value among the absolute value of the difference between the red image signal and the green image signal, the absolute value of the difference between the green image signal and the blue image signal, and the absolute value of the difference between the blue image signal and the red image signal as the RGB color difference.

10. The method of claim 8, wherein the gain decreases as the RGB color difference decreases.

11. The method of claim 8, wherein the gain decreases as saturation of each of the unit pixels decreases.

12. The method of claim 8, wherein the calculating of the gain 12. is performed according to:

$$\text{gain} = \frac{(\text{weight2} - \text{weight21})}{\text{RGB\_diff\_MAX!}} \times \text{RGB\_diff} + \text{weight1},$$

wherein:

the weight1 denotes the first weight value, and the weight2 denotes the second weight value;

the RGB_diff_MAX denotes a maximum RGB color difference; and the RGB_diff denotes the RGB color difference.

13. The method of claim 12, wherein, in the calculating of the gain, the first weight value and the second weight value are less than 1 and greater than 0, wherein the first weight value is less than the second weight value.

14. The method of claim 8, wherein the applying of the gain comprises:

outputting, by the gain application circuit, a blue corrected image signal by applying the gain and a maximum value of the gain to the blue image signal according to:

$$\text{B\_g} = \frac{(B \times \text{gain})}{\text{gain\_MAX}},$$

wherein:

the gain_MAX denotes the maximum value of the gain;

the B denotes the blue image signal; and the B_g denotes the blue corrected image signal.

* * * * *